Nov. 6, 1951 M. J. MITCHELL 2,573,925
CORN PICKER AND HUSKER WITH GRAIN RECOVERY DEVICE
Filed Sept. 8, 1947 2 SHEETS—SHEET 1

Inventor
Melville J. Mitchell
By Paul O. Pippel
Atty.

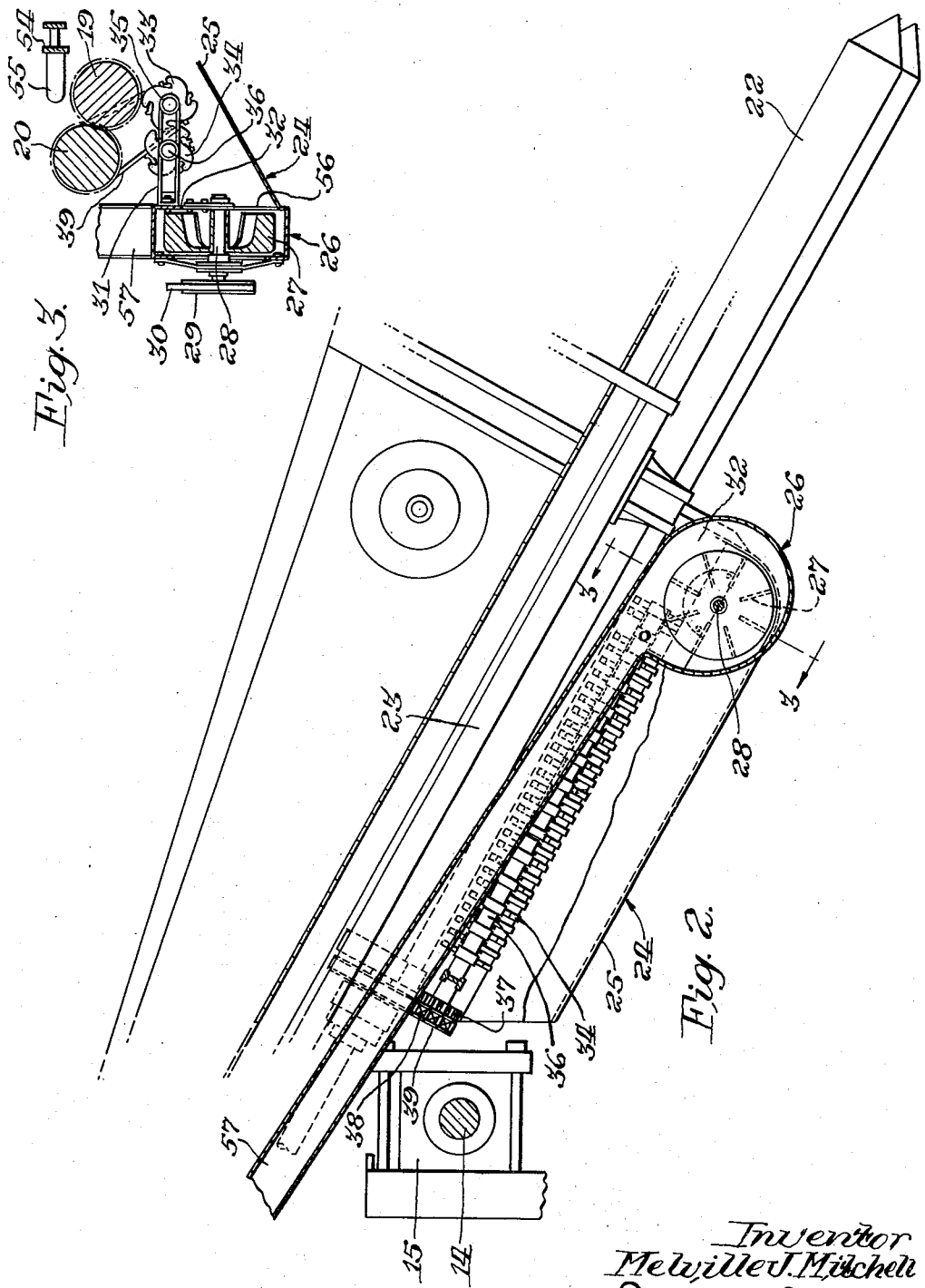

Patented Nov. 6, 1951

2,573,925

UNITED STATES PATENT OFFICE 2,573,925

CORN PICKER AND HUSKER WITH GRAIN RECOVERY DEVICE

Melville J. Mitchell, Highland Park, Ill., assignor to International Harvester Company, a corporation of New Jersey Application September 8, 1947, Serial No. 772,680

3 Claims. (Cl. 130—5)

This invention relates to a new and improved corn picker and has for one of its principal objects the provision of means for saving corn shelled during the husking operation.

An important object of this invention is to provide a corn picker having inclined husking rolls and means therebeneath to recover grain shelled during the husking operation.

Another and further important object of this invention is the provision of means in a corn picker having inclined snapping and husking rolls including a husk agitator and discharge beneath the husking rolls and a corn recovery and delivery mechanism for corn shelled during the husking operation.

A still further object of this invention is to provide grain throwing means mounted beneath and at the lower end of inclined husking rolls in a corn picker for delivering grain shelled during the husking operation upwardly and at one side of the inclined rolls of the corn picker.

Other and further important objects will become apparent from the disclosures in the following specification and accompanying drawings in which:

Figure 2 is an enlarged detail partially in section of the grain recovery apparatus employed in this corn picker.

Figure 3 is a sectional view taken on the line 3—3 of Figure 2.

As shown in the drawings:

Figure 1:
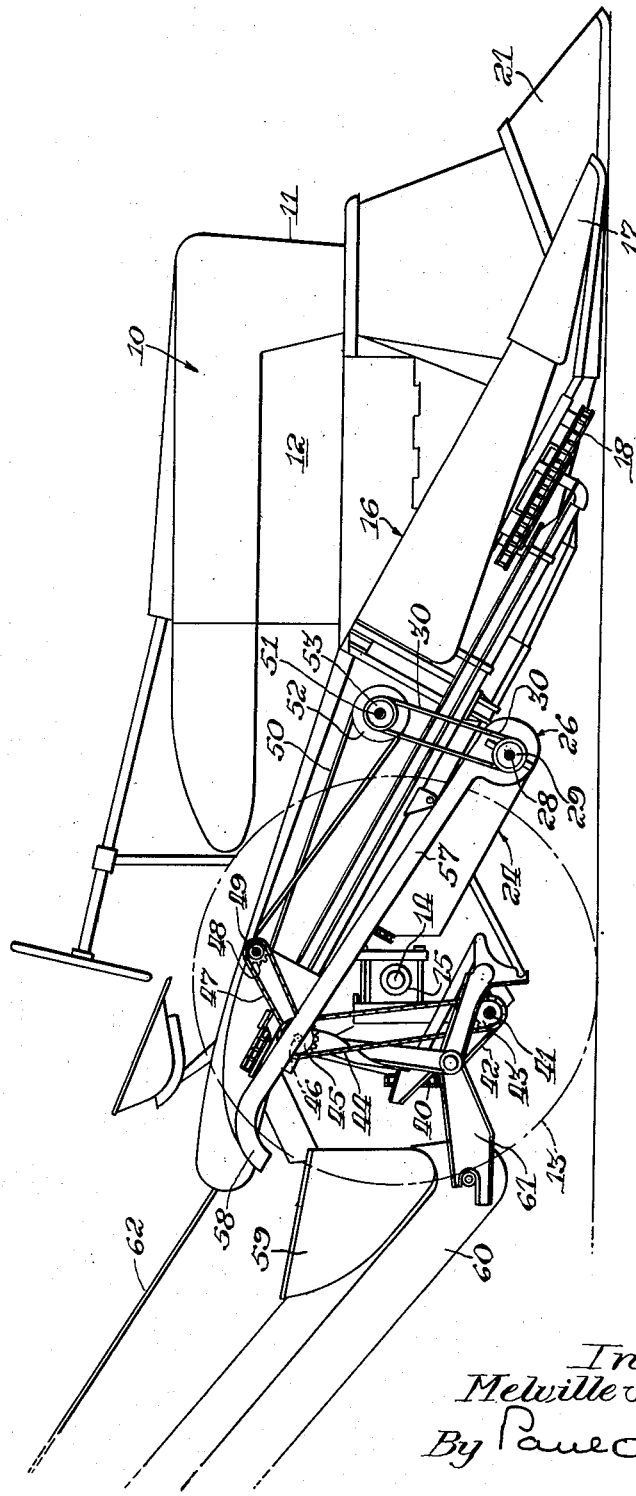
Figure 1 is a side elevational view of the tractor-mounted corn picker with grain saver of this invention.

The reference numeral 10 indicates generally an agricultural tractor having a narrow longitudinally extending body portion 11 and an engine 12 mounted on the forward end thereof. The body 11 is supported by narrow dirigible wheels (not shown) at the forward end thereof and widely spaced large traction wheels 13 at the rear thereof. The traction wheels 13 are mounted on and driven by axles 14 enclosed within housings 15.

Corn picking units 16 are mounted between the long body structure 11 and the widely spaced traction wheels 13. The corn picker may be of the one- or two-row variety merely by duplicating the corn picking unit on the other side of the body structure 11. The corn picking unit 16 includes an outer gathering point 17, gathering chains 18, and combined snapping and husking rolls 19 and 20. The inner gathering point comprises a center divider 21 mounted on the tractor and shielding the dirigible wheels. The center divider forms the inner gathering point for both picking units if the corn picker is of the two-row type.

As the tractor-mounted corn picker traverses a field of corn, the standing stalks are guided into the corn picking units by the center divider 21 and the outer gathering point 17. The gathering chain 18 then grips the stalks and feeds them to the combination snapping and husking rolls 19 and 20. These rolls 19 and 20 are divided into two portions, upper and lower portions. The lower forward portions, as shown at 22, are equipped with means to effect snapping of the ears from the stalks. The upper and rearward ends of the rolls, as shown at 23, are equipped with means to effect removal of the husks from the snapped ears of corn.

Beneath the husking portion of the combined snapping and husking rolls is a housing 24. The housing includes a floor 25 inclined as shown in Figure 2 from a point at the rear upper end of the rolls forwardly and downwardly to a point midway of the combination rolls 19 and 20, and as shown in Figure 3 inclined in the other plane from a position relatively close to the under side of the roll 19 downwardly and laterally across the under side of the rolls 19 and 20. The housing 24 is provided with a chamber 26 carrying a fan or thrower member 27 mounted on a shaft 28 and having a V-belt pulley 29 keyed or otherwise fastened to the shaft 28 outside of the chamber 26 as shown in Figure 3. A V-belt 30 is adapted to impart rotational drive to the fan or thrower 27.

A bracket 31 is fixedly attached to the inside wall 32 of the fan housing or chamber 26 and carries a pair of combination cooperative husk removal and agitating rolls 33 and 34. As shown in Figure 2, these rolls 33 and 34 extend substantially the entire length of the housing 24 from a position adjacent the fan housing 26 to the upper ends of the husking portions 23 of the rolls 19 and 20. The agitating rolls 33 and 34 are respectively mounted on shafts 35 and 36. The upper ends of these shafts 35 and 36 are equipped with intermeshing gears 37 whereby rotation of one roll causes immediate and opposite rotation of the adjacent roll. In addition to the pinion gear 37, a sprocket 38 is mounted on the shaft 35, and by means of a chain 39 drive is imparted downwardly from the combination snapping and husking roll 20 as best shown in Figure 3.

The mechanism for driving the corn picker rolls and gathering chains is conventional and has not been shown in detail for that reason. The driving mechanism which may be employed on this picker is more fully shown in Patent No. 2,351,515. The fan or throwing mechanism, as previously stated, is driven by means of the V-belt 30. Drive for this belt is obtained from the tractor power take-off which directly drives a sprocket 40 at the rear of the tractor and thereupon imparts drive to the shaft 41 by means of the belt 42 and suitable gearing or the like associated with the sprocket 40. A sprocket 43 mounted on the shaft 41 carries a chain 44 which drives a sprocket 45 on a shaft 46. A chain 47 then imparts drive from the shaft 46 to a sprocket 48 mounted on a shaft 49. A V-belt 50 carries drive from the shaft 49 to the shaft 51 by means of the V-belt pulley 52. A second V-belt pulley 53 mounted on the shaft 51 carries the V-belt 30 and drive is therefore transmitted from the tractor power take-off to the fan shaft 28.

In operation, the corn picker traverses a field of corn in such a manner that the rows of corn are directed between the outer gathering point 17 and the inner center divider 21 of each of the corn picking units. The stalks are initially engaged by the gathering chains 18 and thereupon are engaged by the snapping portions 22 of the cooperative rolls 19 and 20. The rolls are rotated inwardly toward each other so that the stalks are pulled downwardly therebetween. The ears of corn are snapped from the stalks during this pulling of the stalks downwardly through the rolls. The free ears are then elevated by suitable conveying means such as an ear forwarder chain 54 having lugs 55 positioned at regular intervals around the periphery thereof. The lugs 55 carry the snapped ears upwardly along the top surface of the cooperative rolls 19 and 20 to a position over the husking portion 23 of the rolls. The husks are then removed from the snapped ears by a squeezing action and the removed husks are carried downwardly between the rolls 19 and 20 whereupon they drop onto the cooperative agitating rolls 33 and 34.

It is common knowledge that some small part of the kernels of corn is shelled or stripped from the cobs at the time the husks are squeezed or torn off the ears. As a rule this shelled corn merely falls back into the field and thus for many purposes is wasted. It is therefore one of the primary objects of this invention to recover the corn shelled during the husking operation. These shelled kernels of corn drop onto the inclined wall or floor 25 of the housing 24 and fall by gravity downwardly and laterally into the opening 56 of the fan housing 26. The fan or rotor 27 receives the corn and provides an impelling force, throwing and blowing it up the tubular member 57 which proceeds upwardly and rearwardly from its juncture with the fan housing 26 past the cooperative rolls 19 and 20 to a downwardly curved elbow portion 58 directing the discharge of the corn into a transversely positioned hopper 59 at the rear of the tractor which normally receives the snapped and husked ears of corn from both corn picker units preliminary to elevation to a trailing wagon by an elevator 80. The hopper 59 and wagon elevator 60 are mounted on a draw-bar 61 of the tractor 10 and are additionally anchored or attached to the tractor by means of a brace rod 62. The corn thus shelled during the husking operation is thereupon delivered to the trailing wagon along with the regularly snapped and husked ears of corn so that a very minimum of corn is lost.

In addition to saving the kernels of corn that drop directly and freely through the rolls 19 and 20, the device of this invention is adapted to shake loose and save the many kernels of corn which become entangled or lodged in the numerous folds of the husks. This is accomplished by the agitating rolls 33 and 34 which cause a "churning" of the husks in such a manner that the corn held therein is shaken loose and dropped down onto the inclined floor 25 in the same manner as previously described for the free shelled corn coming directly through the rolls 19 and 20. The cooperative husk discharge and agitating rolls 33 and 34 are adapted to rotate oppositely from the rolls 19 and 20 so that instead of feeding material inwardly therebetween the husks and trash and other foreign material are thrown outwardly over either lateral side of the housing 24 thereupon providing for relatively clean shelled corn entering the fan or thrower housing 26.

Numerous details of construction may be varied throughout a wide range without departing from the principles disclosed herein and I therefore do not propose limiting the patent granted hereon otherwise than as necessitated by the appended claims.

What is claimed is:

1. In a corn picking and husking machine including a pair of upwardly and rearwardly inclined cooperative husking rolls, hopper means at the rear of the machine for receiving husked ears of corn, an ear conveyor means positioned adjacent said rolls and adapted to transport ears upwardly and rearwardly to said hopper means, a housing structure located beneath the cooperative husking rolls for receiving kernels of corn shelled by the husking rolls, means beneath the husking rolls for discharging husks and trash laterally of said housing structure, a forwardly and downwardly inclined floor in said housing structure for gravitationally feeding shelled corn laterally of and to the forward end of said husking rolls, fan means forming part of said housing and positioned adjacent the lower forward end of said inclined floor, and a conduit inclined upwardly and rearwardly from said fan means running past and substantially parallel to said husking rolls and discharging into said hopper means, whereby kernels of corn shelled during the husking of the ears of corn fall downwardly through the husking rolls and onto the forwardly and downwardly inclined floor whereupon they are delivered forwardly to the fan by gravity and thereupon delivered rearwardly to the hopper means.

2. A device as set forth in claim 1 in which said means beneath the husking rolls comprises combination cooperative husk removal and agitating rolls positioned longitudinally of, parallel to, and beneath said husking rolls.

3. A device as set forth in claim 2 in which said cooperative husking rolls rotate inwardly toward each other, and the combination cooperative husk removal and agitating rolls rotate outwardly away from each other opposite the direction of rotation of said husking rolls, whereby said agitating rolls remove loose kernels of corn from the husks, deposit the husks laterally of said housing structure, and permit the loose kernels of corn to fall into the fan means for delivery through the conduit to the hopper.

MELVILLE J. MITCHELL.

REFERENCES CITED

The following references are of record in the file of this patent:

UNITED STATES PATENTS

| Number | Name | Date |
|---|---|---|
| 667,193 | Crosby | Feb. 5, 1901 |
| 808,264 | Vandegrift | Dec. 26, 1905 |
| 1,155,173 | Tschantz | Sept. 28, 1915 |
| 1,344,563 | Promenschenkel | June 22, 1920 |
| 1,386,207 | Sissel | Aug. 2, 1921 |
| 1,672,501 | Rosenthal | June 5, 1928 |
| 2,419,898 | Johnson | Apr. 29, 1947 |